March 31, 1931.  S. W. NICHOLSON  1,798,553

WINDOW CONTROL MECHANISM

Filed June 5, 1922  2 Sheets-Sheet 1

Inventor
STANLEY W. NICHOLSON.

By Whittemore, Hulbert, Whittemore, & Belknap
Attorneys.

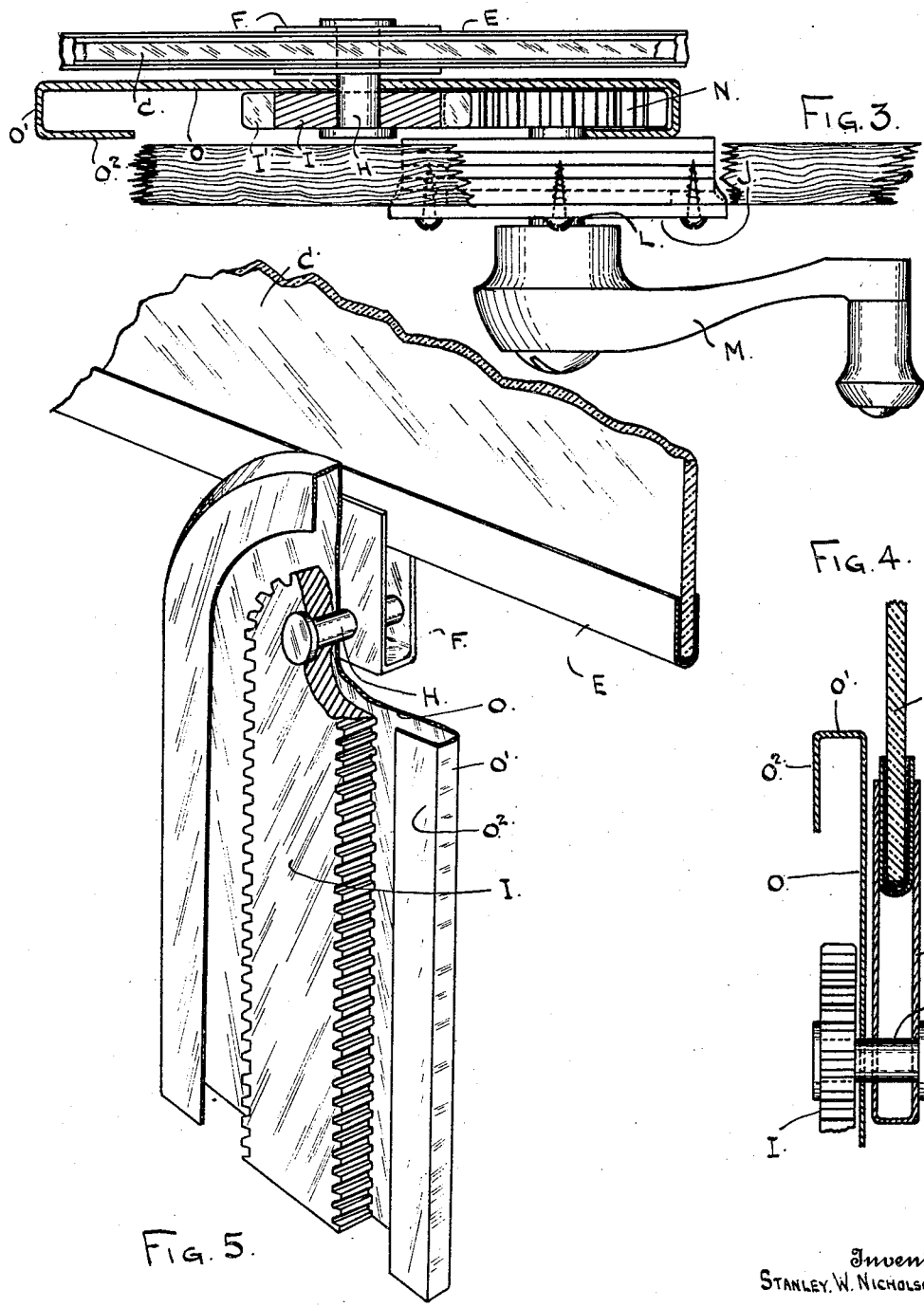

Patented Mar. 31, 1931

1,798,553

UNITED STATES PATENT OFFICE

STANLEY W. NICHOLSON, OF TOLEDO, OHIO, ASSIGNOR, BY MESNE ASSIGNMENTS, TO THE DURA COMPANY, OF TOLEDO, OHIO, A CORPORATION OF OHIO

WINDOW CONTROL MECHANISM

Application filed June 5, 1922. Serial No. 565,863.

This invention relates to window control mechanism and particularly to control mechanisms for the sliding windows of vehicles.

The invention consists in the structural features and arrangement of parts hereinafter described.

In the drawings:—

Figure 3 is a cross section on line 3—3 of Figure 1;

Figure 4 is a cross section on line 4—4 of Figure 1;

Figure 5 is a perspective view of a rack bar attached to the sliding window member.

Figure 2:
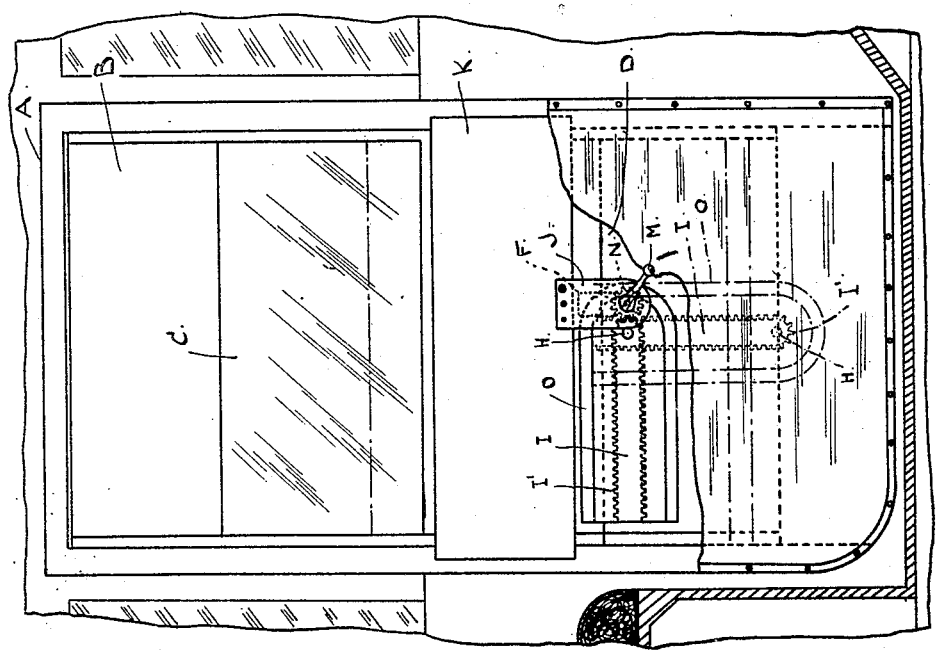
Figure 2 is a similar view showing the half open position of the closure in full lines and the fully opened position in dash lines.

In these views the reference character A designates an automobile door having in its upper portion the window opening B and provided with a closure for said opening having the nature of a vertically sliding glass plate C adapted when lowered to enter a well or chamber D formed in the bottom portion of the door.

Figure 1:
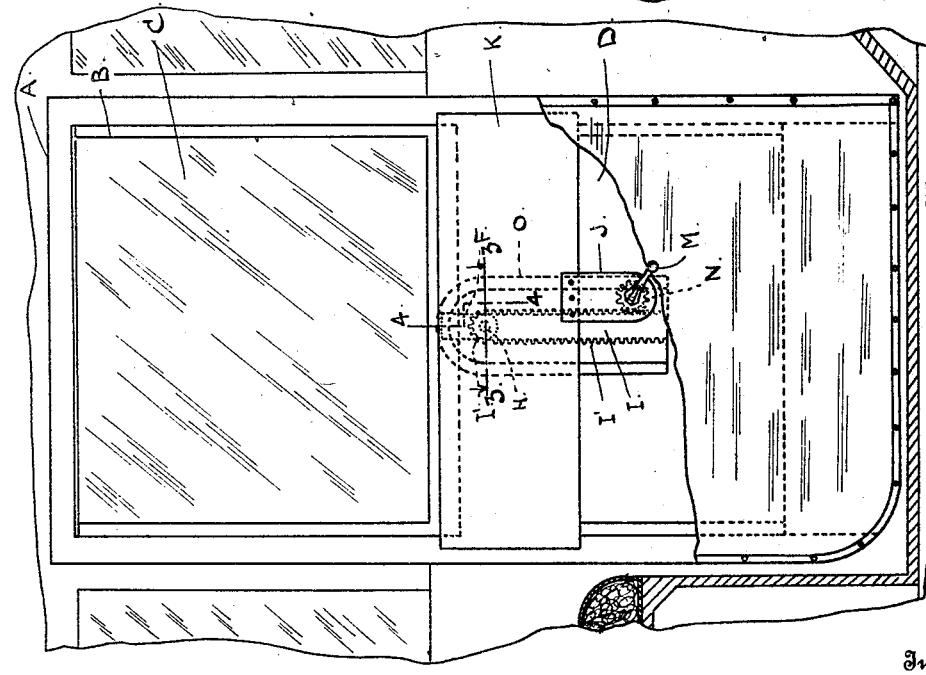
Figure 1 is an interior view of an automobile door equipped with the improved mechanism, the closed position of the sliding closure being shown.

The lower edge of the plate C is engaged, as is common practice, by a U-shaped sheet metal strip E. Midway between its ends, there is rigidly secured to the strip E by spot welding or other suitable means a U-shaped bracket F, providing a mounting for a pin H, upon which is swung the upper end of a rack bar I. Said bar is formed with a rack continuously extending upon both of the vertical edges of the bar and upon the semi-circular upper end thereof, the latter being concentric with the pin H. It will presently appear that said rack bar during travel of the plate C between its closed and half opened position extends downwardly from the pin H, as shown in Figure 1, and extends upwardly from said pin during the lower portion of the travel of the plate, the reversal of position being effected at a mid point in the travel of the glass. J is a bracket secured to and depending from the rock board K, which latter in accordance with common practice extends between the uprights of the door just below the window opening. Said bracket which preferably has the nature of a sheet metal plate forms a bearing adjacent its lower end for a drive shaft L manually actuable by a crank handle M fast upon an end portion of said shaft projecting at the interior side of the door. Between the bracket J and the plane of travel of the glass C, said shaft carries a pinion N meshing with the rack I'. To maintain proper engagement of the rack and pinion there is secured to the rack by shaft welding or other means a sheet metal plate O projecting beyond the toothed edges of the rack, a distance equal to the diameter of the pinion N, said plate engaging the face of the rack bar adjacent the path of travel of the glass C and being marginally flanged away from said path, as indicated at O', said flange projecting a distance substantially equal to the thickness of the pinion N and then being bent toward the rack bar I, as indicated at $O^2$. Thus a portion of the flange O', $O^2$ will always embrace the pinion N and hold the rack bar properly engaged with said pinion.

Any suitable mechanism (not shown) may be provided for rigidly maintaining any desired position of adjustment of the plate C.

In the operation of the described device a counter-clockwise actuation of the handle M (as seen in Figures 1 and 2) effects downward travel of the rack bar I and plate C. During such travel the flanged guide plate O maintains sliding engagement with the pinion N and thereby maintains proper engagement of said pinion with the rack. When the lowering movement of the rack bar has brought the pin H to the horizontal level of the drive shaft L, the pinion N comes into contact with the top portion of the flange O', $O^2$. Since the rack bar can move downward no further in its present position, continued driving of the shaft L necessarily effects a swinging of the rack bar and attached plate O through the intermediate horizontal position shown in full lines in Figure 2 to the final inverted position shown in dash lines in said figure. The downward travel of the rack bar and glass is now renewed and continues until the glass is fully lowered, as seen in Figure 2. In raising the closure C it will be evident that a clockwise actuation of the handle M will reverse the described operation.

The importance of providing for reversal of the position of the rack bar, as described, lies in the fact that it is not possible in a window control mechanism to employ a continuous rack bar having the necessary extent to effect a complete travel of the closure between its limiting positions owing to the limited height of the chamber in which the rack bar must be disposed. The described reversing movement of the rack bar permits the same to have a length equal to only one-half the full travel of the glass.

What I claim as my invention is:—

1. In a device of the character described, a sliding closure, a reversible bar pivoted at one end upon said closure and having racks of teeth upon opposite longitudinal edges and a semi-circular series of teeth upon one end continuous with said racks and centered substantially at its pivot a gear meshing with said teeth for effecting travel of the closure, and means carried by said bar and provided with means outwardly from the teeth thereof for holding the teeth thereof in engagement with said gear and affording the bar freedom to swing on its pivot.

2. In a device of the character described, a sliding closure, a reversible bar pivoted at one end upon said closure and having racks of teeth upon opposite longitudinal edges and a semi-circular series of teeth upon one end continuous with said racks and centered substantially at its pivot, a gear meshing with said teeth for effecting travel of the closure, and guide plate secured to said bar and having a marginal flange spaced outwardly from the teeth thereof for holding said teeth in engagement with the gear and affording the bar freedom to swing on its pivot.

3. In a device of the character described, a sliding closure, a reversible elongated control member pivoted at one end upon said closure and having parallel longitudinally extending driving faces and a driving face upon its pivotal end continuous with said parallel driving faces, a driving member engaging said driving faces for effecting travel of the closure, and means carried by said control member and provided with means outwardly from the driving faces thereof for holding said driving faces in engagement with said driving member and affording the control member freedom to swing on its pivot.

4. In a device of the character described, a sliding closure, a reversible elongated control member pivoted at one end upon said closure and having parallel longitudinally extending driving faces and a driving face upon its pivotal end continuous with said parallel driving faces, a driving member engaging said driving faces for effecting travel of the closure, and a plate secured to said control member and having a flange spaced outwardly from the driving faces thereof for holding said driving faces in engagement with the driving member and affording the control member freedom to swing on its pivot.

In testimony whereof I affix my signature.

STANLEY W. NICHOLSON.